United States Patent [19]

Mashino

[11] Patent Number: 4,642,548
[45] Date of Patent: Feb. 10, 1987

[54] CONTROL APPARATUS FOR CHARGING GENERATOR

[75] Inventor: Keiichi Mashino, Katsuta, Japan

[73] Assignee: Hitachi, Ltd., Tokyo, Japan

[21] Appl. No.: 757,379

[22] Filed: Jul. 22, 1985

[30] Foreign Application Priority Data

Jul. 25, 1984 [JP]  Japan ................. 59-153115

[51] Int. Cl.$^4$ ........................................... H02P 9/00
[52] U.S. Cl. ...................................... 322/25; 322/59;
    322/83; 322/75; 322/80; 322/DIG. 2
[58] Field of Search ................. 322/25, 59, 75, 83,
    322/80, DIG. 2

[56] References Cited

U.S. PATENT DOCUMENTS 2,809,301  10/1957  Short ............................ 322/25 X
3,263,155   7/1966  Dietl ............................ 322/59 X

FOREIGN PATENT DOCUMENTS 39509  3/1979  Japan .

Primary Examiner—Mark O. Budd
Assistant Examiner—Mark D. Simpson
Attorney, Agent, or Firm—Antonelli, Terry & Wands

[57] ABSTRACT

A control apparatus incorporated in a charging generator for controlling interruption of an exciting current supplied to a field winding of the charging generator comprises a power transistor for intermittently interrupting the exciting current, a voltage detecting circuit for controlling on-off of the power transistor depending on the voltage generated by the charging generator, a current detecting circuit for detecting an initial exciting current supplied to the field winding until the charging generator generates an output voltage high enough for starting its charging operation, and a circuit for turning off the power transistor as soon as the value of the current detected by the current detecting circuit exceeds a predetermined setting.

3 Claims, 2 Drawing Figures

CONTROL APPARATUS FOR CHARGING GENERATOR

BACKGROUND OF THE INVENTION

This invention relates to a control apparatus for controlling a charging generator, and more particularly to that used for controlling a charging generator mounted in an automobile.

The control function demanded for a control apparatus controlling a charging generator mounted in an automobile is to supply a required initial exciting current to the excitation winding of the generator in the starting stage of the automobile's engine. According to one of methods proposed hitherto for achieving the demanded control function, a resistor for initial excitation purpose is provided, as disclosed in, for example, Japanese Utility Model Unexamined Publication No. 39509/79. However, the proposed method utilizing such a resistor has not been satisfactory in that the resistor generates heat which is not ignorable. According to another method disclosed in, for example, Japanese Patent Unexamined Publication No. 140112/79, a triggering signal is applied to an exciting transistor for controlling the initial exciting current. Although little heat is generated in this case, the proposed method has been defective in that a complex circuit is required, and the setting of the initial exciting current is not primarily determined due to fluctuation of the characteristic of the magnetic circuit of the generator.

SUMMARY OF THE INVENTION

It is therefore a primary object of the present invention to provide a novel and improved control apparatus for controlling a charging generator, which can supply an initial exciting current of any desired level in spite of a simple circuit structure.

An embodiment of the charging-generator control apparatus according to the present invention which attains the above object is featured by the fact that means are provided for detecting the initial exciting current and switching a power transistor to maintain the initial exciting current at a constant value.

DESCRIPTION OF THE PREFERRED EMBODIMENT

Figure 1:
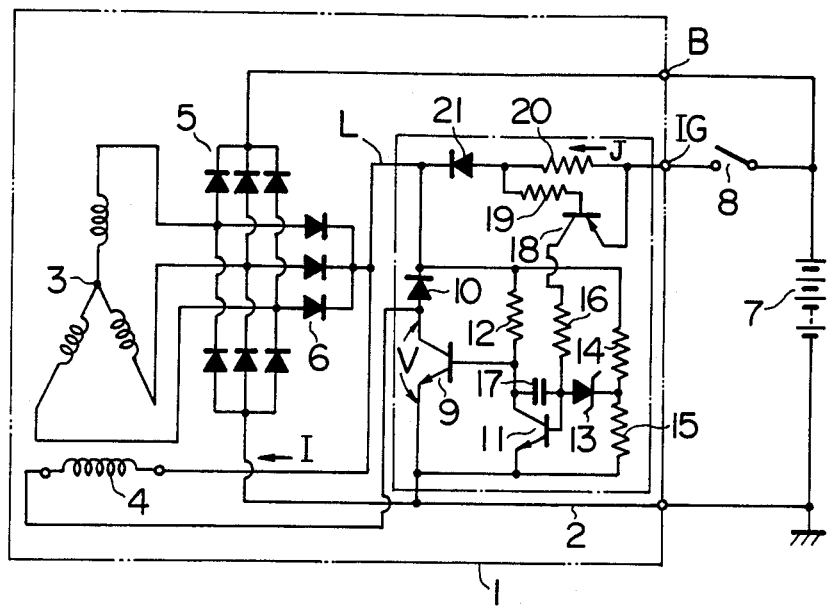
FIG. 1 is a circuit diagram showing the structure of a preferred embodiment of the present invention.

A preferred embodiment of the present invention will now be described in detail with reference to FIG. 1. Referring to FIG. 1, a charging generator 1 includes a control apparatus 2, Y-connected armature windings 3, a field winding 4, a three-phase full-wave rectifier circuit 5 and auxiliary rectifier diodes 6. The generator 1 is connected at its output terminal B to a battery 7 and at its output terminal IG to the battery 7 through a key switch 8. The control apparatus 2 comprises a power transistor 9, a freewheel diode 10, a transistor 11, a resistor 12, a Zener diode 13, voltage-dividing resistors 14, 15, a resistor 16, a capacitor 17, a transistor 18, a resistor 19, a resistor 20, and a diode 21.

When the key switch 8 is turned on in the circuit shown in FIG. 1, an initial exciting current is supplied from the battery 7 to flow through the resistor 20, diode 21, field winding 4 and power transistor 9. Since the generator 1 is not generating the electrical energy yet, the voltage at its terminal L (connected to the cathodes of the auxiliary diodes 6) is low, and the voltage at the connection point between the voltage-dividing resistors 14 and 15 is also low. Therefore, the Zener diode 13 is in its off state.

In the meantime, the initial exciting current increases gradually due to the inductance of the field winding 4. As soon as the terminal voltage of the resistor 20 exceeds the base-emitter voltage of the transistor 18, the transistor 18 is turned on, thereby turning on the transistor 11 and turning off the power transistor 9. Consequently, the exciting current flows now through the freewheel diode 10 and does not flow through the resistor 20. Therefore, the terminal voltage of the resistor 20 is reduced, and the transistor 18 is turned off. Consequently, the transistor 11 is turned off to turn on the power transistor 9, and the exciting current flows through the resistor 20 for excitation of the field winding 4. The operation described above is repeated, and the power transistor 9 is repeatedly turned on and off.

Figure 2:
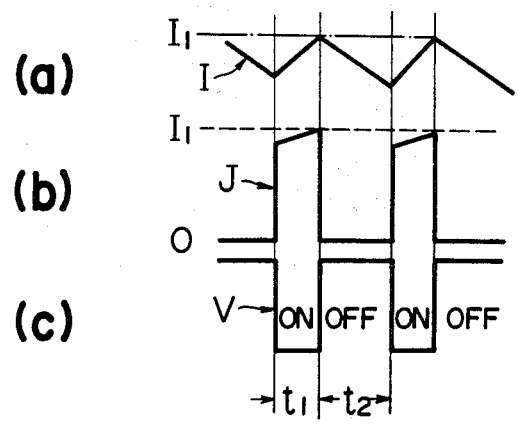
FIGS. 2(a) to 2(c) show waveforms illustrating the operation of the embodiment of the present invention shown in FIG. 1.

FIG. 2 shows the current and voltage waveforms appearing during the repeated on-off operation of the power transistor 9. More precisely, the waveform of the current I flowing through the field winding 4 is shown in FIG. 2(a), while the waveform of the current J flowing through the resistor 20 is shown in FIG. 2(b), and, in relation to these currents I and J, the power transistor 9 is turned on and off with its collector-emitter voltage level changing in a manner as shown in FIG. 2(c). The capacitor 17 shown in FIG. 1 acts to hold the transistor 11 in the conducting state for a certain length of time due to the effect of integration when the transistor 11 turns into its cut-off state from its conducting state, thereby preventing the recurrence (oscillation) frequency from becoming unnecessarily high.

In the state described above, the initial exciting current, whose maximum value is $I_1$, is supplied to the field winding 4, and, as a result of rotation of the armature, the generator 1 starts generation of electrical energy. Once the generation of electrical energy is started, the exciting current is now supplied from the auxiliary diodes 6 and does not flow through the resistor 20, thereby turning off the transistor 18. The generator 1 is placed in a usual voltage control mode in which the voltage at the terminal L is detected by the elements including the Zener diode 13 and transistor 11, and the initial excitation mode is completed. It will thus be seen that the initial excitation can be effected by a simple circuit according to the embodiment of the present invention. Further, since the value of $I_1$ can be freely set as desired by suitably selecting the resistance value of the resistor 20, the adverse effect attributable to the number of turns of the field winding 4 and fluctuation of the resistance values of the various resistors can be eliminated.

The power consumption of the current-detecting resistor 20 will now be calculated. Suppose that $I_1$ is set at $I_1 = 300$ mA. When the base current of the transistor 18 is neglected, the terminal voltage of the resistor 20 would not exceed the base-emitter voltage of the transistor 18 and is about 0.7 volts. Therefore, the power consumption of the resistor 20 is given by 300 mA × 0.7 V = 210 mW. The resistor provided for the purpose of initial excitation in Japanese Utility Model Unexamined Publication No. 39509/79 cited already consumes power as high as about 10 W. Thus, the power consumption of the resistor 20 employed in the present invention is only about 1/50 of that of the prior art resistor. Also, an oscillation circuit is required in the case of Japanese Patent Unexamined Publication No. 140112/79 already cited, and at least two transistors, two capacitors and four resistors are required as circuit elements of such an oscillation circuit. In contrast, provision of only one transistor (the transistor 18) and three resistors (the resistors 16, 19 and 20) in the embodiment of the present invention can exhibit the same effect as that of the prior art circuit, so that the number of required circuit elements can be decreased.

It will be understood from the foregoing description that the feedback control of the initial excitation current value according to the present invention can effectively control the initial excitation current without resorting to the use of a prior art high-power resistor or a prior art complex circuit.

I claim:

1. A control apparatus for controlling a charging generator for an automobile, comprising:

armature windings across which an alternating current output voltage is generated in response to rotation of the armature;

rectifier circuit means connected to said armature windings for rectifying the alternating current output voltage;

battery means for supplying electric energy and being charged by the rectified output of said armature windings through said rectifier circuit means;

a field winding for providing a magnetic field for said armature windings;

semiconductor switching means connected in series to said field winding for intermittently interrupting an exciting current supplied to said field winding;

voltage regulation means for sensing the rectified output voltage of said armature windings charging said battery means and for controlling the exciting current supplied to said field winding through said semiconductor switching means;

means for detecting the amplitude of the exciting current supplied from said battery means to said field winding at least until said generator enables a charging operation;

means for comparing the detected amplitude of the exciting current with a predetermined level and for controlling an on-off operation of said semiconductor means so as to suppress the initial exciting current to a level no more than the predetermined level which predetermined level is sufficient to enable the charging operation by said generator.

2. A control apparatus according to claim 1, wherein said means for detecting the amplitude of the exciting current supplied from said battery means to said field winding includes a first resistor connected between said battery means and said field winding, and a PNP transistor having an emitter connected to one end of said first resistor and a base connected to one end of a second resistor, the other end of said second resistor being connected to the other end of said first resistor, said PNP transistor having a collector connected to one end of a third resistor, said third resistor having another end connected to said means for controlling the on-off operation of said semiconductor switching means.

3. A control apparatus according to claim 2, wherein said means for controlling the on-off operation of said semiconductor switching means includes a capacitor for preventing a high rate of the on-off operation of said semiconductor switching means.

* * * * *